(12) United States Patent
Hveding et al.

(10) Patent No.: US 10,962,408 B2
(45) Date of Patent: Mar. 30, 2021

(54) QUASI-FUNDAMENTAL-MODE OPERATED MULTIMODE FIBER FOR DISTRIBUTED ACOUSTIC SENSING

(71) Applicants: Saudi Arabian Oil Company, Dhahran (SA); King Abdullah University of Science and Technology, Thuwal (SA)

(72) Inventors: Frode Hveding, Dhahran (SA); Islam Ashry, Thuwal (SA); Mao Yuan, Thuwal (SA); Mohd Sharizal Bin Alias, Thuwal (SA); Boon Siew Ooi, Thuwal (SA); Muhammad Arsalan, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 145 days.

(21) Appl. No.: 16/295,212

(22) Filed: Mar. 7, 2019

(65) Prior Publication Data

US 2020/0284647 A1    Sep. 10, 2020

(51) Int. Cl.
*G01H 9/00* (2006.01)
(52) U.S. Cl.
CPC ................. *G01H 9/004* (2013.01)
(58) Field of Classification Search
CPC .... G01D 5/35361; G01H 9/004; G01V 1/208; G01V 1/226
See application file for complete search history.

(56) References Cited

U.S. PATENT DOCUMENTS

| | | | |
|---|---|---|---|
| 5,708,500 A | 1/1998 | Anderson | |
| 5,892,860 A | 4/1999 | Maron et al. | |
| 7,668,411 B2 | 2/2010 | Davies et al. | |
| 9,581,489 B2 | 2/2017 | Skinner | |
| 9,599,505 B2 | 3/2017 | Lagakos et al. | |
| 9,880,096 B2 | 1/2018 | Bond et al. | |
| 10,209,383 B2 | 2/2019 | Barfoot et al. | |
| 2009/0304322 A1 | 10/2009 | Davies et al. | |
| 2012/0060615 A1* | 3/2012 | Farhadiroushan | G01D 5/35303 73/655 |
| 2015/0034580 A1 | 2/2015 | Nakao et al. | |

(Continued)

FOREIGN PATENT DOCUMENTS

| | | |
|---|---|---|
| CN | 102471701 | 5/2012 |
| CN | 107664541 | 6/2018 |
| WO | WO 2014/116458 | 7/2014 |

OTHER PUBLICATIONS

PCT International Search Report and Written Opinion in International Appln. No. PCT/US2020/020785, dated Jun. 18, 2020, 16 pages.

(Continued)

*Primary Examiner* — Francis C Gray
(74) *Attorney, Agent, or Firm* — Fish & Richardson P.C.

(57) ABSTRACT

Systems and methods include a number of optical pulses are transmitted by transmitting, by a distributed acoustic sensor (DAS), where the optical pulses are transmitted at an input port associated with a multimode fibers (MMF) used by the DAS, and where the fundamental mode of the MMF is excited. A number of backscattered Rayleigh signals are collected by the DAS. The Rayleigh signals are recorded as an output intensity profile. A position along the MMF that is subject to vibrations and corresponding vibration parameters are determined by analyzing the recorded output intensity profile.

20 Claims, 5 Drawing Sheets

(56) References Cited

U.S. PATENT DOCUMENTS

| | | | |
|---|---|---|---|
| 2015/0114127 A1* | 4/2015 | Barfoot | G01H 9/004 73/655 |
| 2017/0038246 A1 | 2/2017 | Coates et al. | |
| 2017/0260846 A1 | 9/2017 | Jin et al. | |
| 2018/0045543 A1 | 2/2018 | Farhadiroushan et al. | |
| 2018/0052041 A1 | 2/2018 | Yaman et al. | |
| 2018/0202843 A1 | 7/2018 | Artuso et al. | |
| 2018/0284304 A1 | 10/2018 | Barfoot et al. | |
| 2019/0072379 A1* | 3/2019 | Jalilian | G01L 1/246 |
| 2020/0018149 A1* | 1/2020 | Luo | G01H 9/004 |

OTHER PUBLICATIONS

Bao et al., "Recent development in the distributed fiber optic acoustic and ultrasonic detection," Journal of Lightwave Technology vol. 35, No. 16, Aug. 15, 2017, 12 pages.

Chen et al., "Distributed acoustic sensor based on two-mode fiber," Optics Express, Sep. 2018, 9 pages.

Juarez and Taylor, "Field test of a distributed fiber-optic intrusion sensor system for long perimeters," Applied Optics vol. 46, No. 11, Apr. 10, 2007, 4 pages.

Keiser, "Optical fiber communications," p. 26-57, McGraw Hill, 2008, 16 pages.

Vysloukh, "Chapter 8: Stimulated Raman Scattering," p. 298-302, in Nonlinear Fiber Optics, 1990, 5 pages.

Wang et al., "Rayleigh scattering in few-mode optical fibers," Scientific reports, vol. 6, Oct. 2016, 8 pages.

Yamate et al., "Optical sensors for the exploration of oil and gas," Journal of Lightwave Technology vol. 35, No. 16, Aug. 15, 2017, 8 pages.

PCT International Search Report and Written Opinion in International Application No. PCT/US2020/046300, dated Oct. 26, 2020, 24 pages.

\* cited by examiner

QUASI-FUNDAMENTAL-MODE OPERATED MULTIMODE FIBER FOR DISTRIBUTED ACOUSTIC SENSING

TECHNICAL FIELD

The present disclosure relates to designing a phase-sensitive optical time domain reflectometry (Φ-OTDR) based distributed acoustic sensor (DAS) system and, in particular, to designing an Φ-OTDR based DAS system using multimode fiber (MMF).

BACKGROUND

Optical fiber DAS systems have been widely employed in a myriad of industrial applications, such as the oil and gas industry and real-time structural health monitoring. Optical fiber DAS system is designed using the Φ-OTDR, and exploits the Rayleigh scattering to sense acoustic vibrations by transmitting a pulse of laser light into the fiber optic. As this pulse of light travels down the fiber optic, interactions within the fiber result in light reflections known as backscatter. Such reflections can be determined by strain (or vibration) events within the fiber optic that are caused by localized acoustic energy. The backscattered light travels backwards to the DAS system where it is sampled at the Rayleigh frequencies. The time it takes to accurately map the backscatter event to a fiber distance is known as optical time domain reflectometry (OTDR). As a result, each point of the resulting OTDR trace corresponds to a unique spatial position along the optical fiber's length. If an acoustic vibration makes physical contact with the optical fiber at some points along its length, the phase of the backscatters will change proportionally. In this way, by measuring the phase of the Rayleigh backscatters in concert with the time of alight analysis, a signal of the acoustic vibrations (such as amplitude and frequency) can be sensed at any point along the optical fiber's length.

SUMMARY

Implementations of the present disclosure are generally directed to designing an Φ-OTDR based DAS system using MMF. Specifically, in such designed DAS system, only the fundamental mode in the MMF is excited so that only the backscattered Rayleigh signals associated with the excited fundamental mode are collected. In this way, the MMF operates in a quasi-fundamental-mode (QFM) state to behave similarly as the standard single-mode fiber (SMF) and fit the operation principle requirements of the Φ-OTDR based DAS.

In some implementations, a number of optical pulses are transmitted by transmitting, by a DAS, where the optical pulses are transmitted at an input port associated with a MMF used by the DAS, and where the fundamental mode of the MMF is excited. A number of backscattered Rayleigh signals are collected by the DAS. The Rayleigh signals are recorded as an output intensity profile. A position along the MMF that is subject to vibrations and corresponding vibration parameters are determined by analyzing the recorded output intensity profile.

Implementations of the described subject matter, including the previously described implementation, can be implemented using a computer-implemented method; a non-transitory, computer-readable medium storing computer-readable instructions to perform the computer-implemented method; and a computer-implemented system including one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, in comparison to SMF, MMF is cheaper to install and maintain; therefore, it is commercially desired to use the cheap and already installed MMF instead of SMF in a DAS system. Further, because the MMF power threshold of nonlinearity is much greater than that of the standard SMF, comparing with the typical SMF-based DAS system, one can pump pulses with greater power to offer DAS system with longer sensing range and better spatial resolution. Additionally, exciting only the fundamental mode within the MMF can alleviate the impact of intermodal coupling and dispersion found in the normally operated MMF. Furthermore, since the core diameter of the MMF is larger than that of the SMF, light propagating inside the MMF is closer to the surrounding environment than that guided by SMF. As a result, MMF-based DAS would be more sensitive to an environmental vibrations intrusion than the SMF-based DAS.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DETAILED DESCRIPTION

Figure 1:
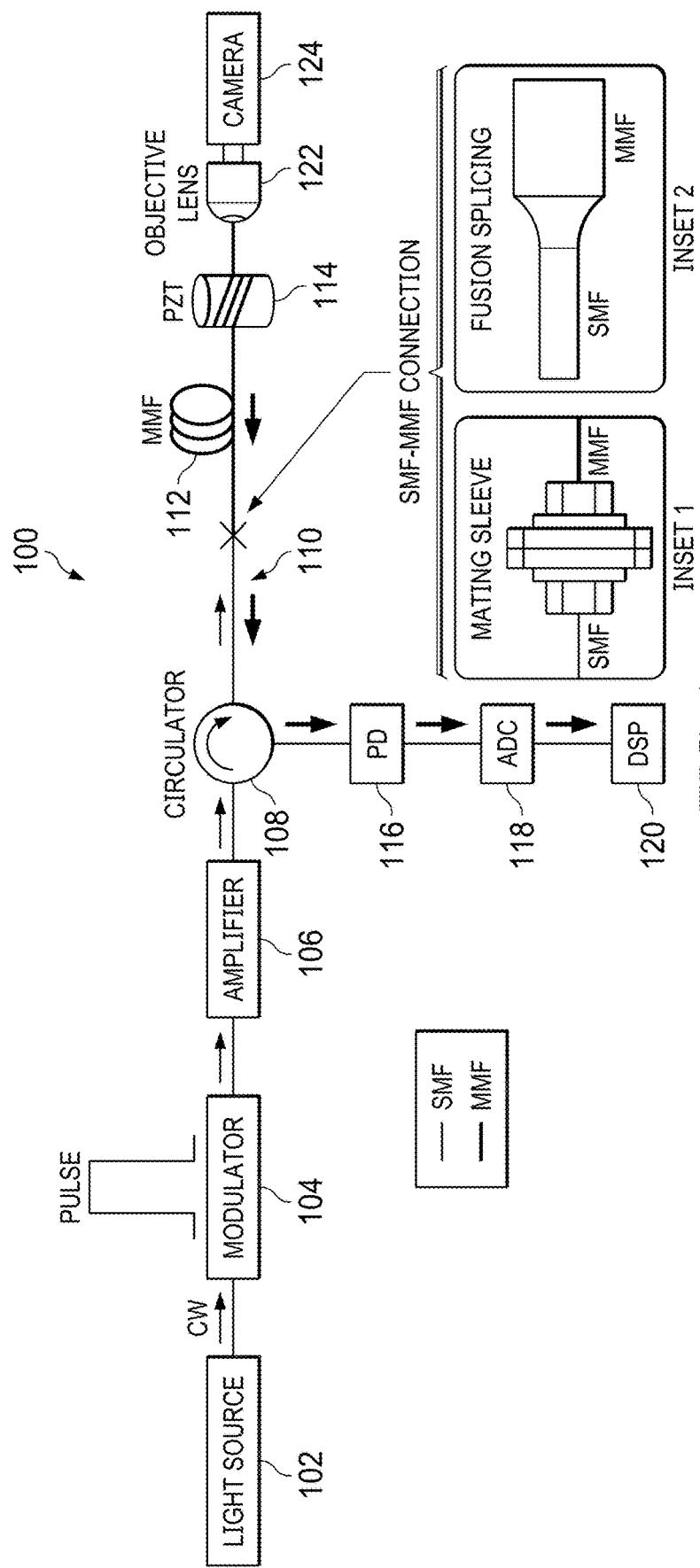
FIG. 1 is an example of a graph illustrating an environment where a quasi-fundamental-mode operated MMF-based DAS can be implemented, according to some implementations of the present disclosure.

The present disclosure describes designing a Φ-OTDR based DAS system using MMF, and is presented to enable any person skilled in the art to make and use the disclosed subject matter in the context of one or more particular implementations. Specifically, in such designed DAS system, only the fundamental mode in the MMF is excited so that only the backscattered Rayleigh signals associated with the excited fundamental mode are collected. In this way, the MMF operates in a QFM state to behave similarly as the standard SMF and fit the operation principle requirements of the Φ-OTDR based DAS. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

The basic operation of the typical Φ-OTDR based DAS consists of launching a train of optical pulses, generated by a narrow linewidth laser, into a SMF. At the SMF input port, consecutive Rayleigh backscattered traces are recorded in the time domain. Each Rayleigh trace has a speckle-like profile because of coherent interference of the signals reflected by scattering centers within the injected pulse duration. By monitoring the intensity temporal evolution of the recorded Rayleigh traces, a position along the fiber subjected to vibrations and the vibrations amplitudes and frequencies can be determined.

In general, the standard SMF-based optical systems are more expensive than those based on the MMF. This is mainly due to the precise calibrations required for injecting light into the small core diameter of the SMF. As a result, MMF is more commonly used than SMF, especially for short-distance (<10 kilometer (km)) applications. As a particular example, there are a large number of MMFs already installed worldwide in oil wells for distributed temperature sensing (DTS). Consequently, there is a strong commercial motivation to utilize the already installed MMFs for DAS systems. However, if the optical fiber supports propagating a large number of modes, similar to the case of MMF, the signal-to-noise ratio (SNR) of the DAS system would be degraded. This is because the backscattered Rayleigh signal of any section along the fiber becomes the resultant of the interference behaviors of the individual modes. Thus, on average with a large number of modes, the Rayleigh signal would not be sensitive to the vibration event.

To bypass these problems in existing technologies, the present disclosure introduces an Φ-OTDR based DAS system using MMF, of which only the fundamental mode is excited. The designed system improves the SNR by launching great power into the optical fiber (providing the power does not exceed the threshold of the nonlinearity of the fiber), of which only the fundamental mode is excited. Since the threshold of the nonlinearity of the optical fiber depends on the optical fiber dimensions, not on the launched mode, theoretically, exciting only the fundamental mode still offers optimal SNR. The designed system solely collects the backscattered Rayleigh signals associated with the excited fundamental mode. In this way, the MMF can operate in a QFM state while behaving similarly as the standard SMF and fitting the operation principle requirements of the Φ-OTDR based DAS.

The designed system is unique with mode management in both forward and backward directions. The forward direction mode management is realized by exciting the fundamental mode in that direction. Specifically, in the forward pump direction, it has been experimentally proved that aligning the axes of the SMF and MMF and then joining them provide the QFM operation within the MMF. Standard MMF supports propagating large number of modes. With increasing the mode order, light spatial intensity distribution is gradually shifted from concentration around the fiber axis to concentration around the fiber core circumstance. For example, the fundamental mode has the maximum intensity at the fiber axis. On the other hand, SMF supports propagating a single mode named "fundamental mode" in the forward direction. It has been experimentally proved that aligning the axes of the SMF and MMF and then joining them provide QFM operation within the MMF when light is transferred from the SMF to the MMF. This is because in such scenario, the system intentionally forces light to have maximum intensity at the MMF axis, which results in exciting only the fundamental mode.

The backward-direction mode management is realized in a different way. In the backward direction, although the pumped light contains only the fundamental mode, detecting the signals of the entire modes still would introduce noise into the DAS. The designed system can reduce the noise by joining the SMF with MMF at the backward direction. Because the axes of these two fibers are well aligned (that is, both of the axes of the SMF and MMF are aligned) and SMF supports propagating only the fundamental mode, joining the SMF and MMF improves the maximum light intensity at the fiber core (fundamental mode) and filters out the remaining modes. As a result, joining the SMF with MMF in the designed system has another significant benefit, which is that the SMF behaves as a mode filter in the backward direction and only collects the Rayleigh signal associated with the fundamental mode. This way, the designed system can always guarantee the existence of the fundamental mode in the backward scattering direction because of the control method of pumping only the same mode.

FIG. 1 is an example of a graph illustrating an environment 100 where a quasi-fundamental-mode operated MMF-based DAS system can be implemented, according to some implementations of the present disclosure. The environment 100 includes a light source 102, a modulator 104, an amplifier 106, a circulator 108, a MMF 112, a piezoelectric transducer (PZT) 114, and an objective lens 122 associated with a camera 122. Each of the light source 102, the modulator 104, the amplifier 106, and the circulator 108 are connected by one or more SMFs 110, and one of the SMFs 110 is joined with the MMF 112. The QFM operated MMF-based DAS senses different vibration locations along the MMF 112, where the MMF 112 is subject to vibration events caused by the light source 102.

In some implementations, the light source 102 can be a coherent light source that generates continuous-wave (CW) light. For example, the light source 102 can be a narrow linewidth laser. In some implementations, the generated CW lights are then converted into optical pulses using the modulator 104. In some implementations, the modulated lights are also amplified using an optical amplifier 106, so that the amplified modulated lights can be launched through a circulator 108 into the MMF 112.

The SMFs 110 are used for the entire fiber connections before injecting the lights into the MMF 112. In order to excite the fundamental mode in the MMF 112, SMF 110 must be connected to MMF 112 at the joining point. Generally, in this system, either SMF or MMF can be used for fiber connections before the joining point. However, if MMF is used, it must be spliced to a SMF 110 before the joining point such that always the joining point connects SMF 110 and MMF 112. In case of using MMF for the fiber connections and eventually splicing it to a SMF, this causes power loss because of a fiber cores mismatch. That is, power is transferred from a large core fiber (for example, MMF) to a smaller core fiber (for example, SMF). Therefore, it is preferred to make all of the connections with SMF, before the joining point. In the present disclosure, efficient transfer of the fundamental mode from the SMF to the MMF can be performed via aligning their axes followed by joining them through techniques such as mating sleeve or fusion splicing (as shown in the insets 1 and 2 in FIG. 1). Both of these two fiber connection mechanisms allow transferring the fundamental linearly polarized mode (that is, the $LP_{01}$ mode) from the SMF to the MMF. Because the performance of the designed system is not significantly affected by using either of these two fiber connection mechanisms, in the subsequent analysis, the present disclosure only presents the results of the case where the SMF 110 and MMF 112 are connected by fusion splicing.

The MMF 112 used in the DAS system can operate in a QFM via mode management in both the forward pumping direction and backward pumping direction. Firstly, the designed system pumps only the fundamental mode into the MMF. It is experimentally proved that the fundamental mode has negligible intermodal coupling with the other modes. This technique is significantly important since it results in dominating the power of the backscattered Rayleigh signals with only the fundamental mode power. Once the MMF 112 is injected with lights, while an optical pulse is propagating along the MMF 112, Rayleigh signals are backscattered. In the backward direction, the Rayleigh signals are collected using the SMF 110 that is associated with the circulator 108. In some implementations, the circulator 108 is further associated with a photodetector (PD) 116, an analog-to-digital converter (ADC) 118, and a digital signal processing (DSP) 120. In this way, the collected backscattered Rayleigh signals can be recorded by the PD 116, and sampled using the ADC 118 to generate data. The DSP 120 can then analyze the generated data and provides the sensing parameters.

In some implementations, to validate the efficiency in this mode transfer, an objective lens 122 is added to the system at the output end of the MMF 112 and a camera 124 to image the MMF output intensity profile. Based on the output intensity profile, position information of the light source 102 and corresponding sensing parameters, such as the corresponding power spectrum of the vibration events can be discovered.

Figure 2:
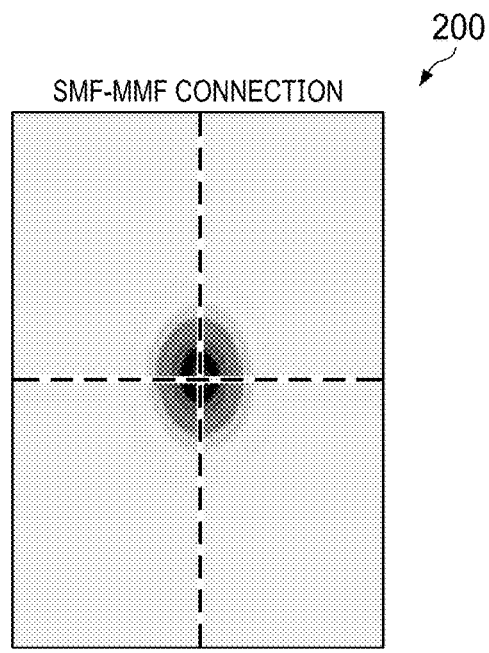
FIG. 2 is an example of a graph illustrating an output intensity profile recorded by a quasi-fundamental-mode operated MMF-based DAS, according to some implementations of the present disclosure.

FIG. 2 is an example of a graph illustrating an output intensity profile 200 recorded by a quasi-fundamental-mode operated MMF-based DAS, according to some implementations of the present disclosure. As illustrated by FIG. 2, the fundamental mode, which almost has two-dimensional Gaussian spatial distribution, is fully excited at the MMF input port and maintains its profile, with almost negligible crosstalk with other modes, until reaching the MMF end. Additionally, capturing this output intensity profile at different time instances results profiles resembles the fundamental mode with minor changes.

Figures 3A, 3B, 3C:
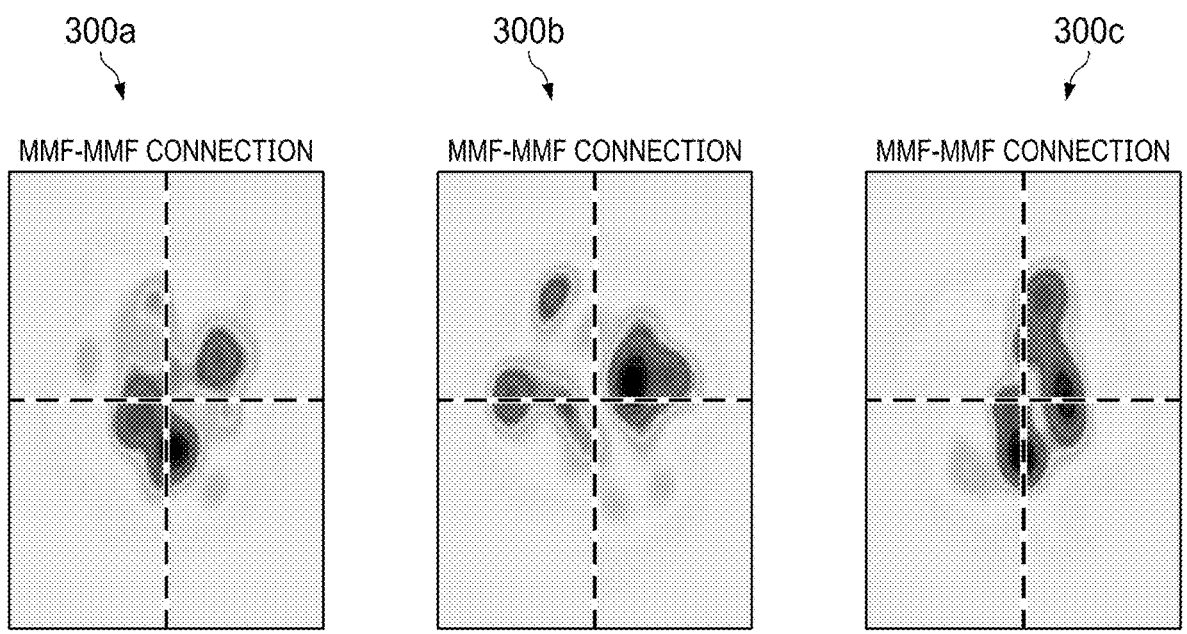
FIG. 3A is an example of a graph illustrating an output intensity profile recorded by MMF-based DAS, where lights are injected into the MMF-based DAS by launching lights into MMF through free-space, according to some implementations of the present disclosure.
FIG. 3B is another example of a graph illustrating an output intensity profile recorded by MMF-based DAS, where lights are injected into the MMF-based DAS by launching lights into MMF through free-space, according to some implementations of the present disclosure.
FIG. 3C is another example of a graph illustrating an output intensity profile recorded by MMF-based DAS, where lights are injected into the MMF-based DAS by launching lights into MMF through free-space, according to some implementations of the present disclosure.

FIG. 3A is an example of a graph illustrating an output intensity profile 300a recorded by a MMF-based DAS, where lights are injected into the MMF-based DAS by launching lights into the MMF through free-space, according to some implementations of the present disclosure. FIG. 3B is another example of a graph illustrating an output intensity profile 300b recorded by a MMF-based DAS, where lights are injected into the MMF-based DAS by launching lights into the MMF through free-space, according to some implementations of the present disclosure. FIG. 3C is another example of a graph illustrating an output intensity profile 300c recorded by a MMF-based DAS, where lights are injected into the MMF-based DAS by launching lights into the MMF through free-space, according to some implementations of the present disclosure.

Results illustrated by FIGS. 3A-3C are generated by a MMF-based DAS as the one shown in FIG. 1, where the SMF-based circulator, as the circulator 108 shown in FIG. 1, is replaced with another MMF-based circulator, without changing other optical and electronic components of the system in FIG. 1. This is because within the fiber-based circulator, light is transferred between fibers by passing through free-space in between. The modified system repeats imaging the beam profiles consists of many speckles with various intensities and the spatial distribution of these speckles varies in the time domain, as shown in FIGS. 3A-3C. The speckle-like profile is a result of combining many modes and its rapid temporal shape change occurs because of the intermodal coupling within the MMF. As a result, comparing with the intensity profile illustrated in FIG. 2, it is shown that the technique proposed in the present disclosure exciting only the fundamental mode in the MMF can be integrated with DAS system that requires single-mode operation. On the other hand, the free-space coupling of light into MMF would introduce significant noise in DAS system because of the excitement of a large number of modes.

Figure 4A:
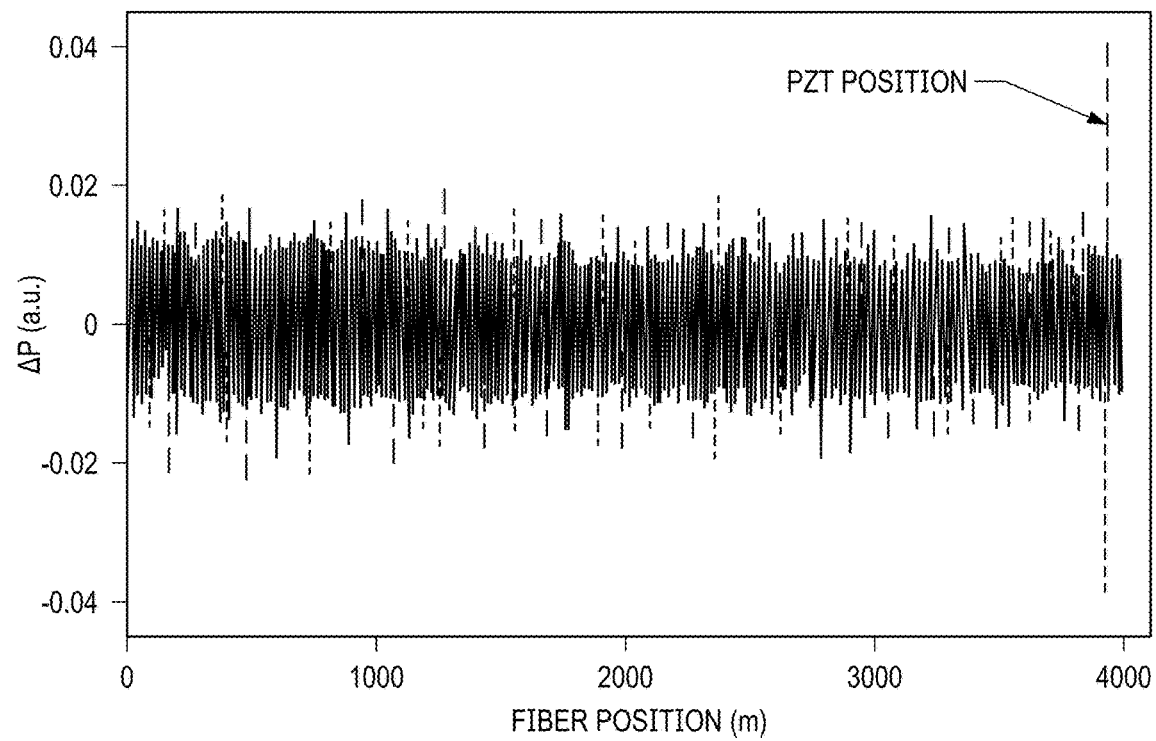
FIG. 4A is an example of a graph illustrating position information of a location along the MMF that is subjected to a vibration event, according to different average schemes, according to some implementations of the present disclosure.
Figure 4B:
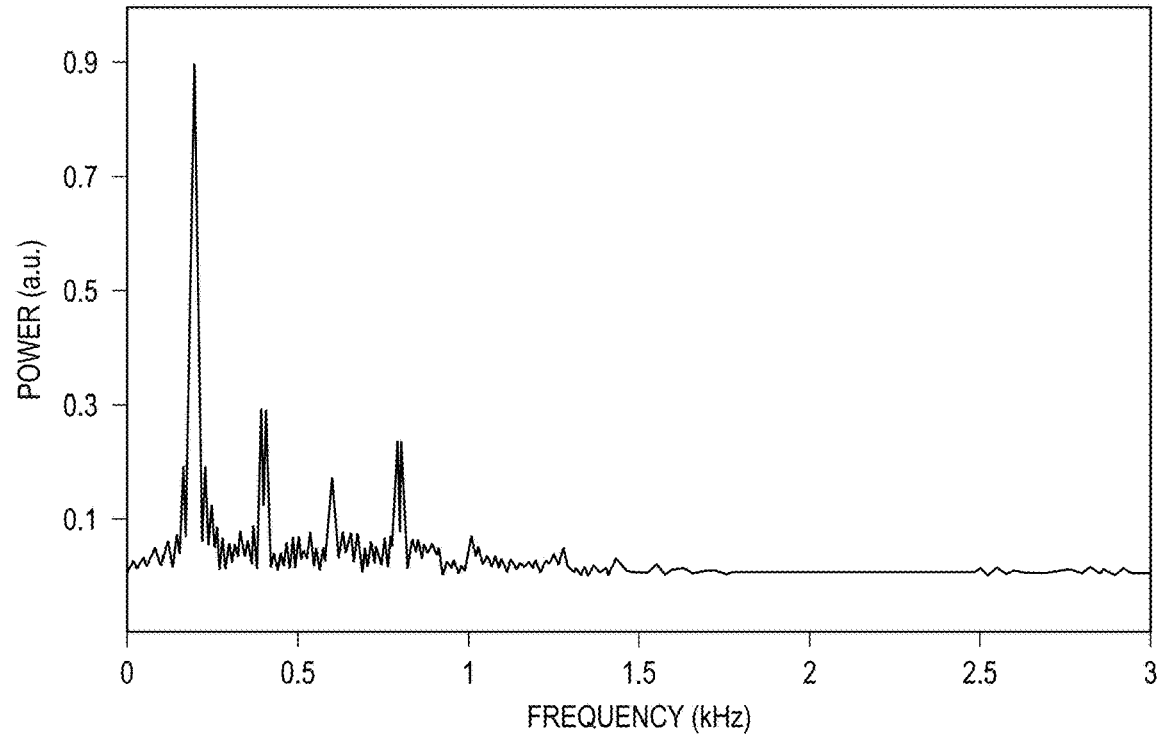
FIG. 4B is an example of a graph illustrating a corresponding power spectrum of the vibration event, according to some implementations of the present disclosure.
Figure 4C:
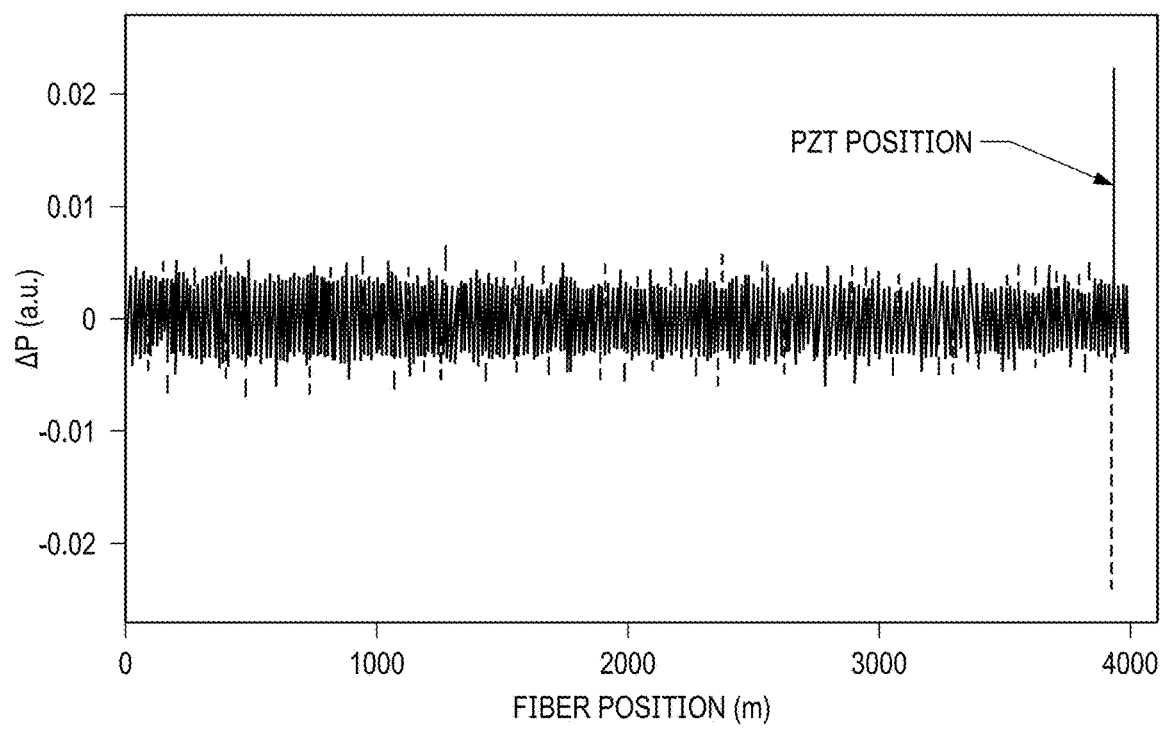
FIG. 4C is an example an example of a graph illustrating position information of another location along the MMF that is subject to the vibration event, according to different average schemes, according to some implementations of the present disclosure.
Figure 4D:
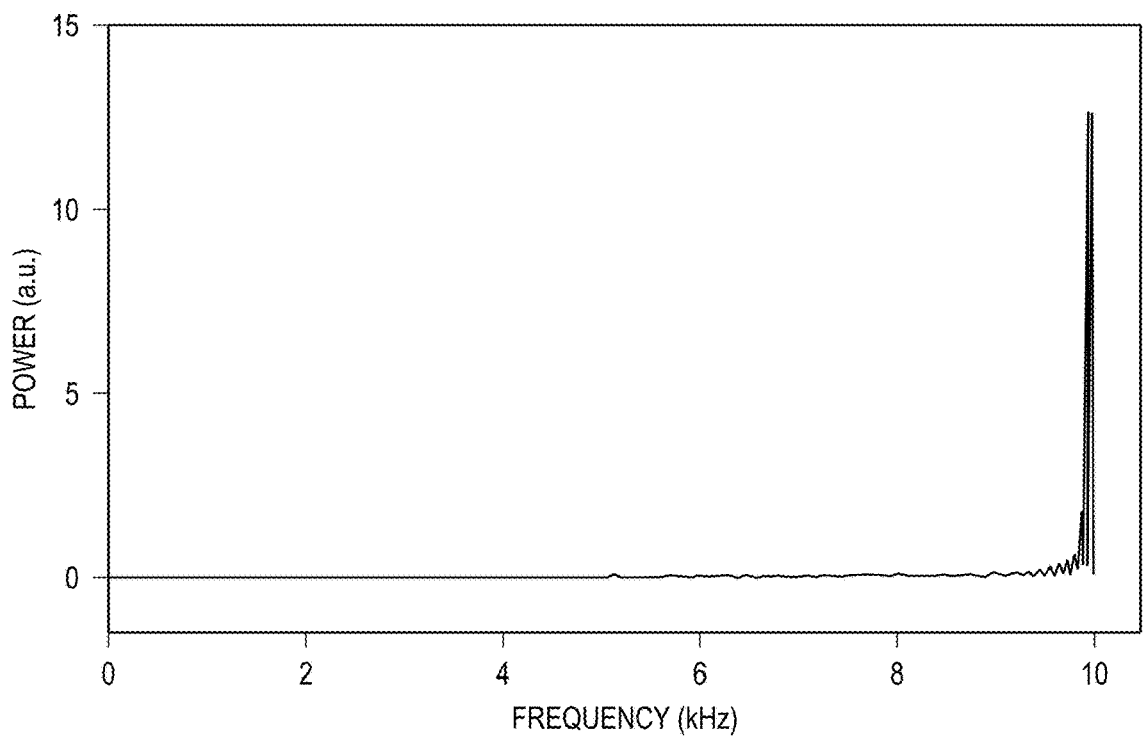
FIG. 4D is an example of another graph illustrating another corresponding power spectrum of the vibration event, according to some implementations of the present disclosure.

FIG. 4A is an example of a graph illustrating position information 400a of a location along the MMF that is subjected to a vibration event, according to different average schemes, according to some implementations of the present disclosure. FIG. 4B is an example of a graph illustrating a corresponding power spectrum 400b of the vibration event, according to some implementations of the present disclosure. FIG. 4C is an example of a graph illustrating position information 400c of another location along the MMF that is subject to the vibration event, according to different average schemes, according to some implementations of the present disclosure. FIG. 4D is an example of another graph illustrating another corresponding power spectrum 400d of the vibration event, according to some implementations of the present disclosure.

FIGS. 4A-4D illustrate the performance of the designed MMF-based DAS in terms of discovering a location along the fiber subjected to a vibration event and calculating the frequency components of this vibration. To test the performance, the system uses a PZT cylinder as a vibration source. PZT cylinder is typically used to calibrate DAS because its vibrations frequency can be predetermined using its driving function generator. Using an experimental set up as the environment 100 shown in FIG. 1, pulses of 100 nanosecond (ns) width and 20 kilohertz (kHz) repetition rate are generated. The length of the used MMF is ~4 km and its core diameter is 62.5 micrometer (μm). Near the MMF end, where the SNR is minimum, a 10 meter (m) section of the MMF is attached to the PZT cylinder. Based on these experimental parameters and following the sampling theory, the maximum detectable vibration frequency (Nyquist frequency) of this system equals 10 kHz. Typically, the differential signal JP (measured in arbitrary units (a.u.)), which is calculated via subtracting the consecutive Rayleigh traces, is used to determine out a vibrations position along the optical fiber. FIG. 4A shows the position information of the PZT source, at the fiber end, when it is vibrating with 200 Hz frequency. Once the vibrations location is identified, the vibrations frequency can be calculated by applying Fourier transform on the Rayleigh raw traces at this position. FIG. 4B is the corresponding power spectrum of the 200 Hz vibrations event that exhibits accurate frequency detection. The PZT is further driven with 10 kHz vibration frequency (Nyquist frequency). As respectively shown in FIGS. 4C and 4D, the vibrations position and frequency can still efficiently be identified. Based on these results, it is conclude that the QFM operated MMF can fulfill the operation requirements of the Φ-OTDR based DAS.

Figure 5:
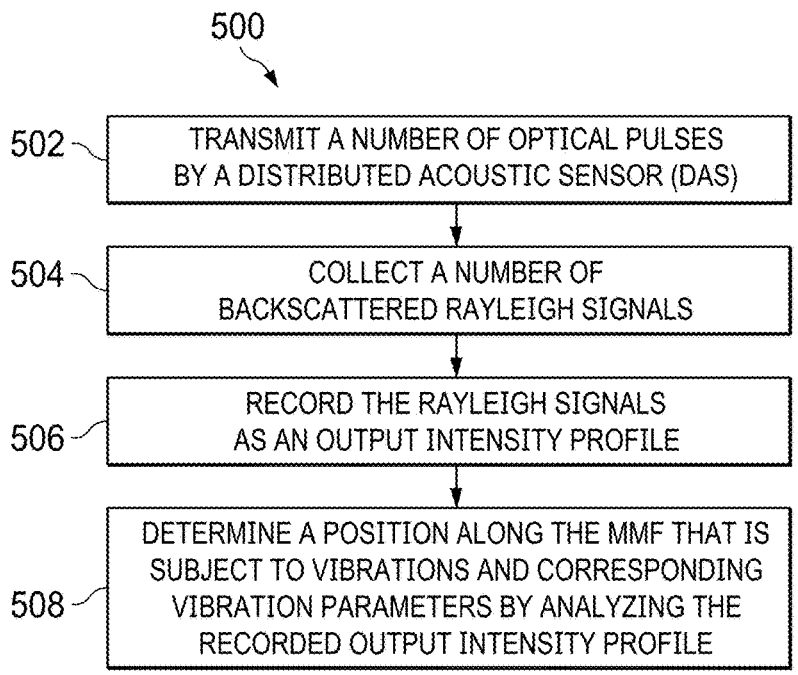
FIG. 5 is a flowchart of an example method for determining a position information of a vibration location along a MMF using a quasi-fundamental-mode operated MMF-based DAS, according to some implementations of the present disclosure.

FIG. 5 is a flowchart of an example method 500 for determining a position information of a vibration location along a MMF using a quasi-fundamental-mode operated MMF-based DAS, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a number of optical pulses are transmitted using a DAS, where the optical pulses are transmitted at an input port associated with a MMF used by the DAS, and where the fundamental mode of the MMF is excited. In some implementations, the DAS is based on an Φ-OTDR.

In some implementations, the optical pulses travel along a SMF prior to be transmitted at the input port associated with the MMF. In such implementations, the SMF and MMF are connected by aligning axes associated with the SMF and axes associated with the MMF. After 502, method 500 proceeds to 504.

At 504, a number of backscattered Rayleigh signals are collected by the DAS. In some implementations, the backscattered Rayleigh signals are collected using the SMF associated with a circulator. After 504, method 500 proceeds to 506.

At 506, the Rayleigh signals are recorded as an output intensity profile by the DAS. In some implementations, the Rayleigh signals are recorded at a photodetector associated with the DAS. After 506, method 500 proceeds to 508.

At 508, a position along the MMF that is subject to vibrations and corresponding vibration parameters are determined by the DAS by analyzing the recorded output intensity profile.

In some implementations, method 500 further includes, prior to receiving a plurality of Rayleigh signals, launching, at a DAS, a number of optical pulse; and amplifying, by the DAS, the launched optical pulses. After 508, method 500 can stop.

Figure 6:
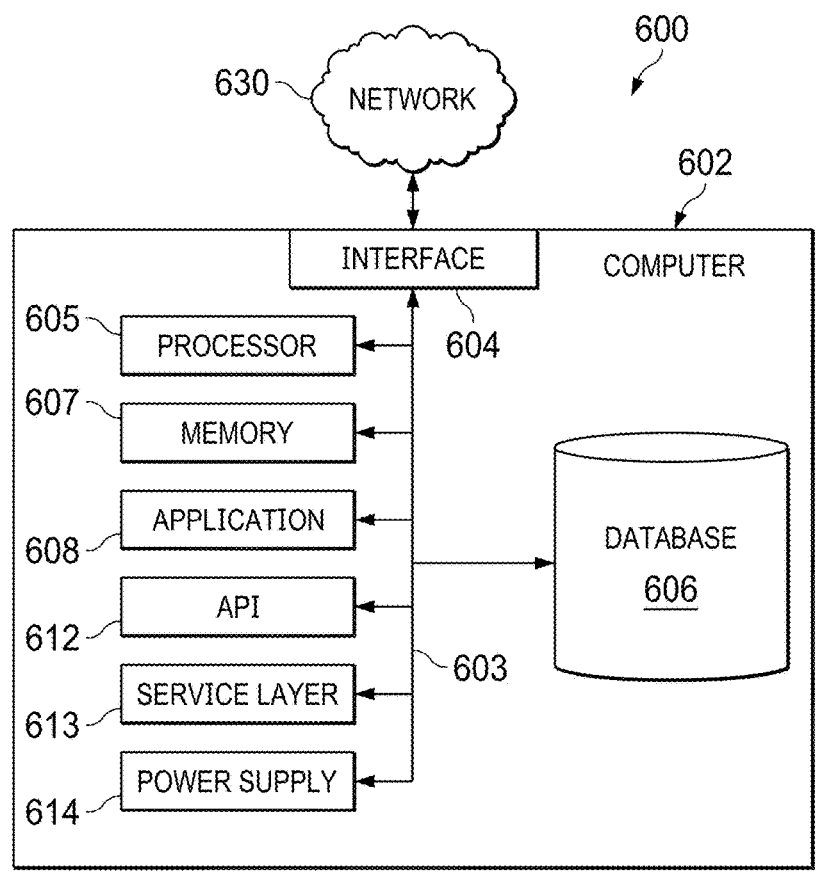
FIG. 6 is a block diagram illustrating an example of a computer-implemented system used to provide computational functionalities associated with described algorithms, methods, functions, processes, flows, and procedures, according to some implementations of the present disclosure Like reference numbers and designations in the various drawings indicate like elements.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method, comprising: transmitting, by a distributed acoustic sensor (DAS), a number of optical pulses, where the number of optical pulses are transmitted at an input port associated with a multimode fibers (MMF) used by the DAS, and where the fundamental mode of the MMF is excited; collecting, by the DAS, a number of backscattered Rayleigh signals; recording, by the DAS, the Rayleigh signals as an output intensity profile; and determining, by the DAS, a position along the MMF that is subject to vibrations and corresponding vibration parameters by analyzing the recorded output intensity profile.

The foregoing and other described implementations can each, optionally, include one or more of the following features:

A first feature, combinable with any of the following features, where the DAS is based on a phase-sensitive optical time domain reflectometry (Φ-OTDR).

A second feature, combinable with any of the previous or following features, where the optical pulses travel along a single-mode fiber (SMF) prior to be received at the input port associated with the MMF.

A third feature, combinable with any of the previous or following features, where the SMF and MMF are connected by aligning axes associated with the SMF and axes associated with the MMF.

A fourth feature, combinable with any of the previous or following features, where the backscattered Rayleigh signals are collected using the SMF associated with a circulator.

A fifth feature, combinable with any of the previous or following features, where the Rayleigh signals are recorded at a photodetector associated with the DAS.

A sixth feature, combinable with any of the previous or following features, the method further including prior to receiving a plurality of Rayleigh signals, launching, at a DAS, a plurality of optical pulse; and amplifying, by the DAS, the launched optical pulses.

In a second implementation, a non-transitory, computer-readable medium storing one or more instructions executable by a computer system to perform operations comprising: transmitting, by a distributed acoustic sensor (DAS), a number of optical pulses, where the number of optical pulses are transmitted at an input port associated with a multimode fibers (MMF) used by the DAS, and where the fundamental mode of the MMF is excited; collecting, by the DAS, a number of backscattered Rayleigh signals; recording, by the DAS, the Rayleigh signals as an output intensity profile; and determining, by the DAS, a position along the MMF that is subject to vibrations and corresponding vibration parameters by analyzing the recorded output intensity profile.

The foregoing and other described implementations can each, optionally, include one or more of the following features:

A first feature, where the DAS is based on a phase-sensitive optical time domain reflectometry (Φ-OTDR).

A second feature, combinable with any of the previous or following features, where the optical pulses travel along a single-mode fiber (SMF) prior to be received at the input port associated with the MMF.

A third feature, combinable with any of the previous or following features, where the SMF and MMF are connected by aligning axes associated with the SMF and axes associated with the MMF.

A fourth feature, combinable with any of the previous or following features, where the backscattered Rayleigh signals are collected using the SMF associated with a circulator.

A fifth feature, combinable with any of the previous or following features, where the Rayleigh signals are recorded at a photodetector associated with the DAS.

A sixth feature, combinable with any of the previous or following features, the method further including prior to receiving a plurality of Rayleigh signals, launching, at a DAS, a plurality of optical pulse; and amplifying, by the DAS, the launched optical pulses.

In a third implementation, a computer-implemented system, including one or more processors and a non-transitory computer-readable storage medium coupled to the one or more processors and storing programming instructions for execution by the one or more processors, the programming instructions instructing the one or more processors to perform operations comprising: transmitting, by a distributed acoustic sensor (DAS), a number of optical pulses, where the number of optical pulses are transmitted at an input port associated with a multimode fibers (MMF) used by the DAS, and where the fundamental mode of the MMF is excited; collecting, by the DAS, a number of backscattered Rayleigh signals; recording, by the DAS, the Rayleigh signals as an output intensity profile; and determining, by the DAS, a position along the MMF that is subject to vibrations and corresponding vibration parameters by analyzing the recorded output intensity profile.

The foregoing and other described implementations can each, optionally, include one or more of the following features:

A first feature, combinable with any of the following features, where the DAS is based on a phase-sensitive optical time domain reflectometry (Φ-OTDR).

A second feature, combinable with any of the previous or following features, where the optical pulses travel along a single-mode fiber (SMF) prior to be received at the input port associated with the MMF.

A third feature, combinable with any of the previous or following features, where the SMF and MMF are connected by aligning axes associated with the SMF and axes associated with the MMF.

A fourth feature, combinable with any of the previous or following features, where the backscattered Rayleigh signals are collected using the SMF associated with a circulator.

A fifth feature, combinable with any of the previous or following features, where the Rayleigh signals are recorded at a photodetector associated with the DAS.

A sixth feature, combinable with any of the previous or following features, the method further including prior to receiving a plurality of Rayleigh signals, launching, at a DAS, a plurality of optical pulse; and amplifying, by the DAS, the launched optical pulses.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    transmitting, by a distributed acoustic sensor (DAS), a plurality of optical pulses, wherein the plurality of optical pulses are transmitted at an input port associated with a multimode fibers (MMF) used by the DAS, and wherein the fundamental mode of the MMF is excited;
    collecting, by the DAS, a plurality of backscattered Rayleigh signals;
    recording, by the DAS, the Rayleigh signals as an output intensity profile;
    determining, by the DAS, a position along the MMF that is subject to vibrations of a vibration event and corresponding vibration parameters by analyzing the recorded output intensity profile; and
    displaying a first graph illustrating a location along the MMF that is subject to the vibrations of the vibration event, and providing a second graph illustrating a corresponding power spectrum of the vibration event, wherein the location is identified by a corresponding fiber position on each of the first graph and the second graph.

2. The computer-implemented method of claim 1, wherein the DAS is based on a phase-sensitive optical time domain reflectometry ($\Phi$-OTDR).

3. The computer-implemented method of claim 1, wherein the optical pulses travel along a single-mode fiber (SMF) prior to be received at the input port associated with the MMF.

4. The computer-implemented method of claim 3, wherein the SMF and MMF are connected by aligning axes associated with the SMF and axes associated with the MMF.

5. The computer-implemented method of claim 3, wherein the backscattered Rayleigh signals are collected using the SMF associated with a circulator.

6. The computer-implemented method of claim 1, wherein the Rayleigh signals are recorded at a photodetector associated with the DAS.

7. The computer-implemented method of claim 1, further comprising:
    prior to receiving a plurality of Rayleigh signals, launching, at a DAS, a plurality of optical pulse; and amplifying, by the DAS, the launched optical pulses.

8. A non-transitory, computer-readable medium storing one or more instructions executable by a computer system to perform operations comprising:

transmitting, by a distributed acoustic sensor (DAS), a plurality of optical pulses, wherein the plurality of optical pulses are transmitted at an input port associated with a multimode fibers (MMF) used by the DAS, and wherein the fundamental mode of the MMF is excited;

collecting, by the DAS, a plurality of backscattered Rayleigh signals;

recording, by the DAS, the Rayleigh signals as an output intensity profile;

determining, by the DAS, a position along the MMF that is subject to vibrations of a vibration event and corresponding vibration parameters by analyzing the recorded output intensity profile; and displaying a first graph illustrating a location along the MMF that is subject to the vibrations of the vibration event, and providing a second graph illustrating a corresponding power spectrum of the vibration event, wherein the location is identified by a corresponding fiber position on each of the first graph and the second graph.

9. The non-transitory, computer-readable medium of claim 8, wherein the DAS is based on a phase-sensitive optical time domain reflectometry ($\Phi$-OTDR).

10. The non-transitory, computer-readable medium of claim 8, wherein the optical pulses travel along a single-mode fiber (SMF) prior to be received at the input port associated with the MMF.

11. The non-transitory, computer-readable medium of claim 10, wherein the SMF and MMF are connected by aligning axes associated with the SMF and axes associated with the MMF.

12. The non-transitory, computer-readable medium of claim 10, wherein the backscattered Rayleigh signals are collected using the SMF associated with a circulator.

13. The non-transitory, computer-readable medium of claim 8, wherein the Rayleigh signals are recorded at a photodetector associated with the DAS.

14. The non-transitory, computer-readable medium of claim 8, further comprising:

prior to receiving a plurality of Rayleigh signals, launching, at a DAS, a plurality of optical pulse; and amplifying, by the DAS, the launched optical pulses.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:

transmitting, by a distributed acoustic sensor (DAS), a plurality of optical pulses, wherein the plurality of optical pulses are transmitted at an input port associated with a multimode fibers (MMF) used by the DAS, and wherein the fundamental mode of the MMF is excited;

collecting, by the DAS, a plurality of backscattered Rayleigh signals;

recording, by the DAS, the Rayleigh signals as an output intensity profile;

determining, by the DAS, a position along the MMF that is subject to vibrations of a vibration event and corresponding vibration parameters by analyzing the recorded output intensity profile; and displaying a first graph illustrating a location along the MMF that is subject to the vibrations of the vibration event, and providing a second graph illustrating a corresponding power spectrum of the vibration event, wherein the location is identified by a corresponding fiber position on each of the first graph and the second graph.

16. The computer-implemented system of claim 15, wherein the DAS is based on a phase-sensitive optical time domain reflectometry ($\Phi$-OTDR).

17. The computer-implemented system of claim 15, wherein the optical pulses travel along a single-mode fiber (SMF) prior to be received at the input port associated with the MMF.

18. The computer-implemented system of claim 17, wherein the SMF and MMF are connected by aligning axes associated with the SMF and axes associated with the MMF.

19. The computer-implemented system of claim 17, wherein the backscattered Rayleigh signals are collected using the SMF associated with a circulator.

20. The computer-implemented system of claim 15, wherein the Rayleigh signals are recorded at a photodetector associated with the DAS.

* * * * *